(12) United States Patent
Srinivasan et al.

(10) Patent No.: US 11,334,630 B2
(45) Date of Patent: May 17, 2022

(54) CONSUMPTION UNIT ESTIMATION ANALYTICS FOR PRESCRIBING CLOUD COMPUTING RESOURCES UTILIZATION

(71) Applicant: Accenture Global Solutions Limited, Dublin (IE)

(72) Inventors: Madhan Kumar Srinivasan, Bangalore (IN); Guruprasad PV, Bangalore (IN); Manish Sharma Kolachalam, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 265 days.

(21) Appl. No.: 16/795,250

(22) Filed: Feb. 19, 2020

(65) Prior Publication Data
US 2021/0256066 A1    Aug. 19, 2021

(51) Int. Cl.
*G06F 16/00* (2019.01)
*G06F 16/9035* (2019.01)
(Continued)

(52) U.S. Cl.
CPC ........ *G06F 16/9035* (2019.01); *G06F 9/5027* (2013.01); *G06Q 10/04* (2013.01); *G06Q 10/06315* (2013.01)

(58) Field of Classification Search
CPC .. G06F 16/9035; G06F 9/5027; G06F 11/328; G06F 11/3442; G06F 2201/81;
(Continued)

(56) References Cited

U.S. PATENT DOCUMENTS

2012/0221454 A1   8/2012  Morgan
2012/0310765 A1*  12/2012 Masters ................ G06F 9/5088
                                            705/26.3
(Continued)

OTHER PUBLICATIONS

Giorgio L. Valentini et al, "Energy-Efficient Resource Utilization in Cloud Computing", IEEE, pp. 377-408 (Year:2014).*
(Continued)

*Primary Examiner* — Jared M Bibbee
(74) *Attorney, Agent, or Firm* — Crowell & Moring LLP

(57) ABSTRACT

A multi-layer consumption unit estimation (CUE) stack may generate a consumption preview for prescribing cloud computing resource utilization. An input layer of the CUE stack may obtain computing resource utilization tracking data, consumption metric data, application execution tracking data, and computing resource reservation data for a set of computing resources. A configuration layer of the CUE stack may determine a CUE interval and determine consumption metric modifiers for a selected identity associated with the set of computing resources. A CUE engine layer may generate a consumption preview by advancing a dynamic consumption credit input/output flow analysis and executing a direct utilization consumption determination. The pre-prescriptive analysis layer may apply a filter metric to mark the preservable computing resource and the correctable computing resource for exclusion from prescriptive utilization processing and initiate the prescriptive utilization processing on the set of computing resources without computing resources marked for exclusion.

20 Claims, 11 Drawing Sheets

(51) Int. Cl.
*G06F 9/50* (2006.01)
*G06Q 10/04* (2012.01)
*G06Q 10/06* (2012.01)

(58) Field of Classification Search
CPC ............. G06F 11/3409; G06F 11/3466; G06F 11/3006; G06Q 10/04; G06Q 10/06315; G06Q 30/04
See application file for complete search history.

(56) References Cited

U.S. PATENT DOCUMENTS

| | | | |
|---|---|---|---|
| 2016/0065499 A1* | 3/2016 | Holmes | H04L 47/827 709/226 |
| 2016/0253215 A1* | 9/2016 | Fang | G06F 9/50 718/104 |
| 2017/0279697 A1* | 9/2017 | Katsaros | H04L 43/0876 |
| 2017/0353531 A1* | 12/2017 | Conn | H04L 67/2861 |
| 2019/0286492 A1* | 9/2019 | Gulsvig Wood | G06F 9/50 |
| 2019/0349210 A1* | 11/2019 | Nayak | H04L 12/1407 |
| 2020/0167195 A1* | 5/2020 | Aronovich | G06F 9/5038 |

OTHER PUBLICATIONS

Extended European Search Report in Europe Application No. 21152565.4, dated Jul. 19, 2021, 8 pages.
Office Action in India Application No. 202144003623, dated Jan. 7, 2022, 5 pages.

* cited by examiner

Figure 8B

CONSUMPTION UNIT ESTIMATION ANALYTICS FOR PRESCRIBING CLOUD COMPUTING RESOURCES UTILIZATION

TECHNICAL FIELD

This disclosure relates to cloud computing, in particular, to consumption unit estimation analytics for prescribing cloud computing resources utilization.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for execution of analytics systems will further enhance the capabilities of cloud computing systems.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIG. 8A-8D illustrate a fourth example consumption unit estimation control interface.

DETAILED DESCRIPTION

Figure 1:
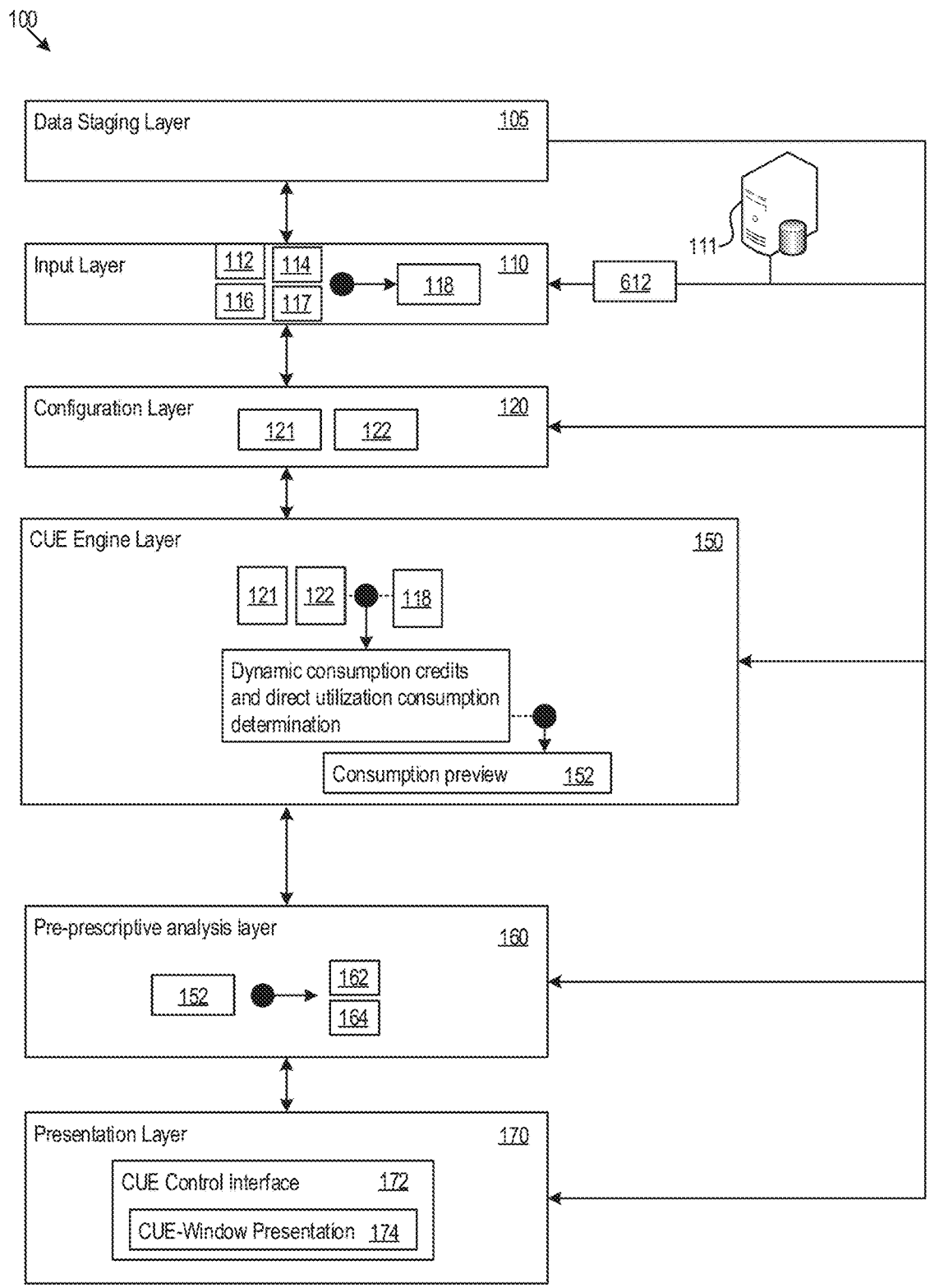
FIG. 1 illustrates an example multiple-layer consumption unit estimation stack.

Cloud computing is a model for enabling convenient, on-demand network access to a shared pool of configurable computing resources, e.g. network, servers, storage, applications, and services, spanning across Infrastructure as a Service (IaaS), Platform as a Service (PaaS), and Software as a Service (SaaS) layers that can be rapidly provisioned and released with minimal management effort or service provider interaction. Generally, public cloud providers like Amazon Web Services (AWS), Microsoft, and Google own and operate the infrastructure and offer access over the Internet. With this model, cloud users in most cases have no visibility or control over consumption of the cloud computing resources. As a result, for example, cloud computing resources may be in an idle state/under-utilized. This reduces the utilization efficiency of the whole cloud computing system.

The present disclosure provides a technical solution to increase the utilization efficiency of the cloud computing system. The consumption unit estimation (CUE) stack techniques and architectures described below may be used to analyze utilizations of consumption units in cloud computing resources and provide a more accurate consumption preview with respect to the cloud computing resources with various levels and granularities. As such, for example, the under-utilized cloud computing resources can be readily identified. In addition, The CUE stack techniques and architectures may further be used to generate pre-prescriptive analysis on the consumption preview for the subsequent prescriptive utilization processing on the cloud computing resources, for example, prescribing the storage class placement recommendations based on analysis of the data output by the pre-prescriptive analysis. Because the pre-prescriptive analysis refines the data output to the subsequent prescriptive utilization process by filtering out the preservable computing resources and the correctable computing resources, it helps to improve the execution efficiency of the prescriptive utilization processing.

The CUE stack may analyze computing resource utilization tracking data, application execution tracking data, computing resource reservation data, and consumption metric data to produce consumption preview and conduct filtering for subsequent prescriptive utilization processing. The computing resource utilization tracking data may include, for example, the utilization data for cloud infrastructures (e.g., network, server, storage, and visualization) and cloud platforms (e.g., operation system, middleware, and run time). Examples of cloud infrastructure may include Amazon Web Services (AWS), Cisco Metapod®, Microsoft Azure®, and Google Compute Engine (GCE). Examples of cloud platforms may include AWS Elastic Beanstalk®, Google App Engine, Apache Stratos®, and OpenShift®. The application execution tracking data may include, for example, the utilization data of cloud applications and services such as Google Apps®, Dropbox®, Salesforce®, Cisco WebEx®, and GoToMeeting®. The consumption metric data may include, for example, pricing data for the cloud infrastructures, platforms, applications and services and account data for individual cloud users. The computing resource reservation data may include, for example, information about reserved cloud resource instances such as reserved virtual machine (VM) instances and reserved database instances.

FIG. 1 shows an example multiple layer CUE stack 100. In this example, the CUE stack 100 includes a data-staging layer 105, an input layer 110, a configuration layer 120, a CUE engine layer 150, a pre-prescriptive analysis layer 160, and a presentation layer 170. The CUE stack 100 may include a multiple-layer computing structure of hardware and software that may implement a cloud based system analyzing the consumption of cloud computing resources for cloud accounts so as to assist the cloud accounts to efficiently and precisely prescribe the utilization of the cloud computing resources.

In various implementations, the CUE stack 100 may be used to analyze the consumption of cloud computing resources on various cloud computing platforms such as AWS, Microsoft Azure®, Google Cloud Platform, or other cloud computing service solutions. Herein, AWS is used as a non-limiting example to describe the systems and methods in the present disclosure.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the CUE stack 100, the data-staging layer 105 may provide the input layer 110 with storage resources to store ingested data within a database or other data structure. In some implementations, the data-staging layer 105 may be deployed as a cloud-based database platform with the capability to handle large amounts of data. In an example, an underlying Big Data Lake of the database platform is capable of ingesting data from heterogeneous data sources such as relational databases, flat files, billing databases, monitoring data, and other data operations. Hence, this illustrates that the data-staging layer 105 may provide hardware resources, e.g., memory storage resources, to the input layer 110. Accordingly, the multiple-layer stack architecture of the CUE stack 100 may improve the functioning of the underlying hardware.

Figure 2:
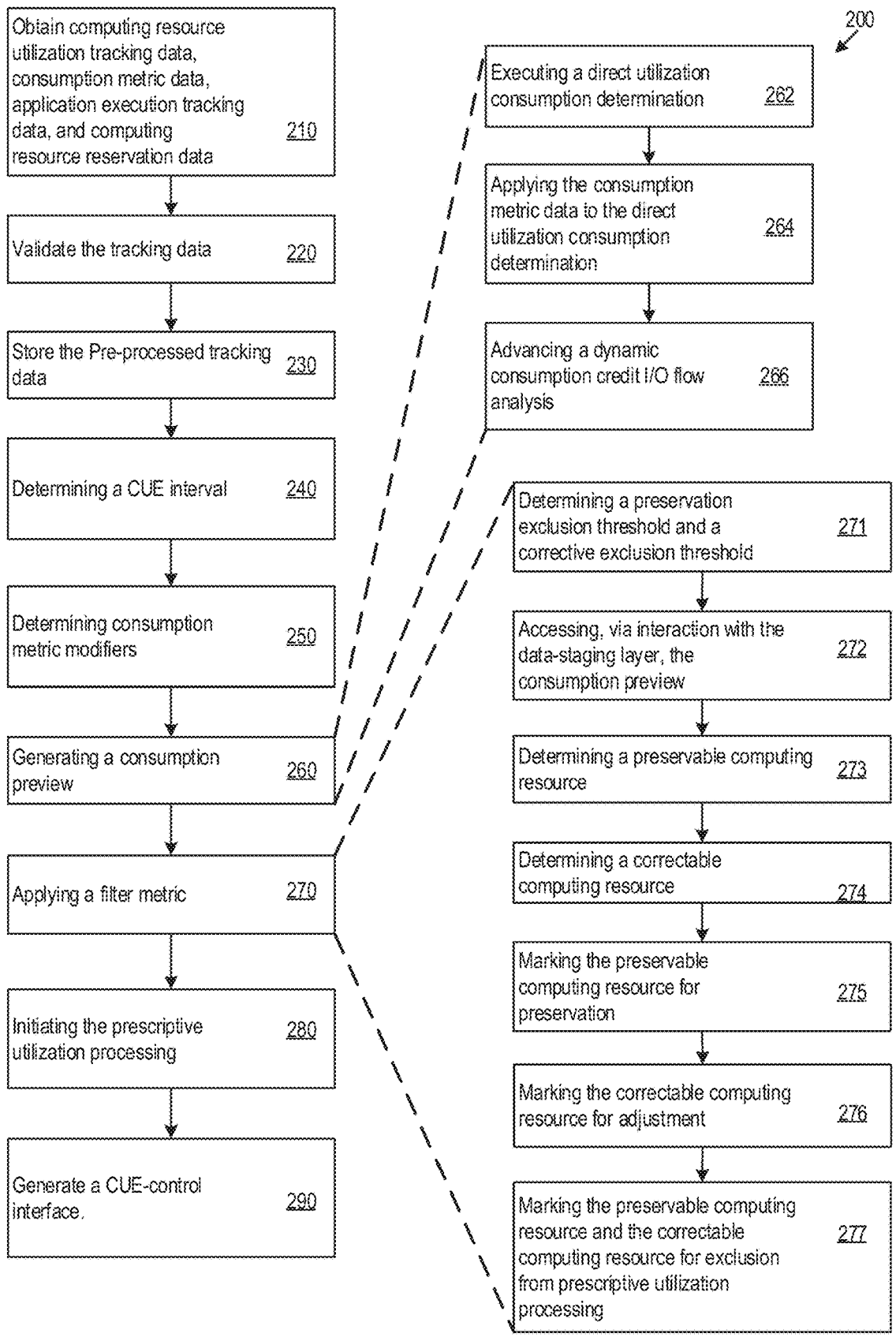
FIG. 2 illustrates example consumption unit estimation logic.

In the following, reference is made to FIG. 1 and the corresponding example CUE logic circuitry (CUL) 200 in FIG. 2. The logical features of CUL 200 may be implemented in various orders and combinations. For example, in a first implementation, one or more features may be omitted or reordered with respect to a second implementation. At the input layer 110 of the CUE stack 100, the CUL 200 may obtain computing resource utilization tracking data 112, consumption metric data 114, application execution tracking data 116, and computing resource reservation data 117 (210) as the input data. In some implementations, the input data may be received via communication interfaces (e.g., communication interfaces 612, discussed below). The input data may be accessed at least in part, e.g., via the communication interfaces 612, from data sources 111. The data sources 111 may comprise various heterogeneous data sources such as relational databases, flat files, billing databases, monitoring data, and other data operations. In some implementations, the data sources 111 may include, a utilization database, a billing database, a master cost database, a reserved-instance purchase database, and/or an SAP monitoring database. These databases may store, for example, hourly frequency billing files, provider specific master cost files containing EC2/VM On-Demand and Reserved Instance (RI) pricing and technical specifications of the cloud resources, RI inventory files, application monitoring files, cloud broker services files, credit tracker files, and/or the like.

Optionally, at the input layer 110, the CUL 200 may validate the input data, i.e., computing resource utilization tracking data 112, consumption metric data 114, application execution tracking data 116, and computing resource reservation data 117 (220). In some implementations, the validation may include data transformations on the input data such as z transformation or log transformation and treatment of outlier data, anomaly data, and missing value data in the input data.

As examples, the CUL 200 may perform the following transformation and treatment operations on the input data:
  Reconcile records with the source data.
  Ensure that no unwanted data is loaded.
  Check data type.
  Remove all types of duplicate/fragmented data.
  Check whether all the keys are in place or not.
  Filter data, for example, selecting only certain columns to load.
  Use rules and lookup tables for data standardization.
  Character set conversion and encoding handling.
  Conversion of units of measurements like date time conversion, currency conversions, numerical conversions, and other data type conversions.
  Data threshold validation check. For example, account number cannot be more than 12 digits.
  Data flow validation from the staging area to the intermediate tables.
  Check if required fields are left blank.
  Clean the data, for example, mapping NULL to 0.
  Split a column into multiples or merge multiple columns into a single column.
  Transpose rows and columns, for example, for storage input/output operation per second (IOPS) data and simple storage utilization data.
  Use lookups to merge data.
  Perform complex data validation. For example, if the first two columns in a row are empty then it automatically rejects the row from processing.

The CUL 200 then may, at the input layer 110, store the validated input data 118 via a memory operation at the data-staging layer 105 (230). In some implementations, the validated input data may be indexed to speed up query processing.

After the validated input data 118 is stored, the configuration layer 120 may access the validated input data 118 using memory resources passed from the data-staging layer 105. At the configuration layer 120, the CUL 200 may determine a CUE interval 121 to analyze consumption of cloud computing resources (240). For example, the CUE interval 121 may be predetermined to be periodical or non-periodical (e.g., hourly, daily, month-date, monthly). For another example, the CUE interval 121 may be selected by the system operator.

In order to analyze the consumption of cloud computing resources by a selected identity such as a cloud user or cloud account, the CUL 200 may, at the configuration layer 120, further determine consumption metric modifiers 122 for the selected identity (250). In some implementations, the account engagement type may be selected by the system operator. In this way, the CUL 200 may determine, for example, if the selected cloud user is a premium customer. Then, the CUL 200 may determine, for example, predetermined financial parameters corresponding to the account engagement type. The financial parameters may include, for example, Enterprise Support Fee (%), AWS Discount (%), Cloud Management Charges (%), FX Risk (%), PMO Contingency (%), Capital Charges–Late Payment (%), ACP CMS/Service Desk (%), Margin/PMO (%), Currency Code, and/or the like.

Optionally, the CUL 200 may determine other consumption metric modifiers 122 for the selected cloud user through the selection of the system operator, for example, multiple cloud providers used by the selected cloud user and consumption analysis scope, e.g., one, multiple, or all cloud computing resources.

At the CUE engine layer 150, the CUL 200 may generate consumption preview for one or more cloud accounts (260). To the end, the CUL 200 may execute a direct utilization consumption determination based on the computing resource utilization tracking data and the application execution tracking data in the validated input data 118 (262) and apply the consumption metric data in the validated input data 118 to the direct utilization consumption determination (264). In some implementations, the CUL 200 may apply the direct utilization consumption determination to generate estimated snapshots for storage blocks in the cloud computing resources. A snapshot is a point-in-time copy of an AWS elastic block store (EBS) volume with limited storage and recovery options. As an example, charges for AWS EBS snapshots are calculated by the gigabyte-month (GB-month)

in Equation 1a below. The calculation takes into account the size of the snapshot and the time length that the snapshot is retained.

$$\text{Estimated Snapshots } (\emptyset) = (o' + \beta) * \overline{k} * \chi * \mu * (\delta) \rightarrow \quad \text{Equation 1a}$$

Where,
O'=EBS general purpose Block Storage (GB)
β=EBS Provisioned IOPS SSD Storage (GB)
$\overline{K}$=Snapshot Churn Constant (for the given period)—Amount of Snapshot changed since the first snapshot
χ=Cloud Provider Discount (if any)
μ=Cloud Managed Service Provider/Broker Discounts on the Virtual Machine (if any)
δ=Other Discounts/fees as user defined constraints Alternatively or additionally, the CUL 200 may apply a direct utilization consumption determination to generate consumed snapshots for storage blocks of cloud computing resources with Equation 1b below.

$$\text{Consumed Snapshots } (\epsilon\{\text{for every Virtual Machine}\}) = \Sigma(\omega) \rightarrow \quad \text{Equation 1b}$$

Where,
ω=Sum of Unblended Cost for Snapshots
Note: Only the "Create Snapshot" operation to be selected for the above equation In some implementations, computing instances that were "rightsized" during the course of the CUE interval 121 will be accounted for in the consumption preview. That is, the consumption analysis will take into account not only the cost of the computing instances such as virtual machines but also the associated data transfer charges, changes in IOPS, EBS attributes, and/or the like. For example, the CUL 200 may apply a direct utilization consumption determination to determine additional block storage costs with Equation 2 below.

$$\text{IF } (\gamma > \alpha, (\gamma + -\alpha)/\alpha * \pi, 0) \rightarrow \quad \text{Equation 2}$$

Where,
γ=EBS Block Storage (GB)
α=Minimum Storage Threshold (typical of cloud provider models)
π=EBS Block Storage gp2/io1/SSD (100 GB-month)
Note: The storage costs are "tiered" in nature and is captured in the input cost file for all cloud computing resources For another example, the CUL 200 may apply a direct utilization consumption determination to determine provisioned IOPS/provisioned volume with Equation 3 below.

$$\text{Provisioned Volume} = (\text{Number of Hours in the current month}) * (\text{Hourly Unit Usage})$$

$$\text{Provisioned IOPS} = (\text{Provisioned Volume}) * (\text{IOPS/GB constant}) \rightarrow \quad \text{Equation 3}$$

Some types of computing instances such as the "t" series in AWS have a central processing unit (CPU) burst feature, and CPU burst credits (%) may thus be accounted for in the consumption preview. In some implementations, the CUL 200 may advance a dynamic consumption credit input/output (I/O) flow analysis based on the CUE interval 121 determined at the configuration layer 120 (266). For example, the CUL 200 may determine an input rate of credits based on the size of a cloud computing instance such as the CPU, determine an output rate of credits based on the computing resource utilization tracking data with respect to the CPU, and then compare the input and output rates to determine a credit accumulation.

Alternatively or additionally, a computing instance such as the CPU usually has a finite computing capacity, thus CUL 200 may drop any accumulated credits above a predetermined instantaneous computational capacity for the size of the computing instance.

As an example, the CUL 200 may determine CPU burst credits with Equation 4 below.

$$\text{Maximum CPU credits that can be accrued} = (\emptyset 1)$$

$$\text{Time to fill empty credit balance } (\overline{k}1) = \emptyset 1/o'1$$

$$\text{Maximum burst duration } @o'1 = \emptyset 1/(o'1)$$

$$\text{Normalized Baseline CPU performance } (\Sigma(\text{CPU})) = \text{If } (\beta(\text{CPU}) < o'1 \text{ then } (((\overline{k}1/(\overline{k}1+o'1)) * o'1) + ((1-(\overline{k}1/(\overline{k}1+o'1))) * o'1)) \text{ else } o'1 + \quad \text{Equation 4}$$

Where (o'1)=Baseline performance per vCPU

In some implementations, the CUL 200 may distinguish between reserved computing resources and on-demand computing resources such that corresponding reserved instance (RI) adjusters and one-demand (OD) adjusters may be accounted for in the consumption preview. The RI adjusters and OD adjusters are cost adjustments made for computing instances of the reserved computing resources and on-demand computing resources.

In an example, the RI adjuster may be a cost adjustment made where on-demand instances are mischaracterized as reserved instances. If a virtual machine is an on-demand instance and there are a few time intervals when derived benefits from using a reserved instance, the CUL 200 may determine an RI adjuster with Equation 5a below. The RI adjuster can be added to the reservation cost of the virtual machine.

$$N * \lambda * \chi * \mu * \delta \rightarrow \quad \text{Equation 5a}$$

Where,
N=No of RI hours
λ=On-Demand Rate,
χ=Cloud Provider Discount (if any)
μ=Cloud Managed Service Provider/Broker Discounts on the Virtual Machine (if any)
δ=Other Discounts/fees as user defined constraints In another example, if the virtual machine is a one-year (all up-front) RI purchase, the CUL 200 may determine the RI adjuster with Equation 5b below. The RI adjuster can be added to the reservation cost of the virtual machine.

$$\tau/n \rightarrow \quad \text{Equation 5b}$$

Where,
τ=RI Upfront amount
n=Periodicity of the billing—If it is monthly, n=12

Alternatively or additionally, if the virtual machine has a more than one-year (all up-front) RI purchase, the CUL 200 may determine the RI adjuster with Equation 5c below. The RI adjuster can be added to the reservation cost of the virtual machine.

$$\text{Step1: } \psi = \tau/(365 * y)/24$$

Where,
τ=RI Upfront amount
y=RI term in years $$\text{Step2: } \psi * \phi * \chi * \mu * \delta \rightarrow \quad \text{Equation 5c}$$

Where,
φ=Number of hours in the first/second half of the billing month
χ=Cloud Provider Discount (if any)

µ=Cloud Managed Service Provider/Broker Discounts on the Virtual Machine (if any)

δ=Other Discounts/fees as user defined constraints

In some implementations, where reserved instances are mischaracterized as on-demand instances, the CUL 200 may determine RI adjusters and OD adjusters for the instances, and then add the RI adjusters to the on-demand cost of the instances and deduct the OD adjusters from the on-demand cost of the instances. The RI adjusters may be determined using Equations 5b and 5c above.

With respect to OD adjusters, they may be the total cost for an on-demand instance which include the monthly on-demand cost plus the snapshot adjustment (difference between estimated snapshots and consumed snapshots with reference to Equations 1a and 1b above). For example, if the virtual machine is an on-demand instance, the CUL 200 may determine the monthly OD adjuster for virtual machine with Equation 6 below.

$$\tilde{O} = N^1 * \lambda^1 * \chi * \mu * \delta$$

Where, $N^1$=Number of hours of Billed Usage for the given period (monthly as standard)

$\lambda^1$=The hourly On-demand rate as per the Cloud Service Provider

χ=Cloud Provider Discount (if any)

µ=Cloud Managed Service Provider/Broker Discounts on the Virtual Machine (if any)

δ=Other Discounts/fees as user defined constraints $$\tilde{O}^1 = \emptyset - \Sigma(\omega)$$

$$\text{OD Adjuster} = \tilde{O} - \tilde{O}^1 \rightarrow \quad \text{Equation 6}$$

In some implementations, the CUL 200 may generate the consumption preview 152 by summing one or more of the aforementioned consumption measurements of the cloud computing resources, including estimated snapshots, consumed snapshots, the additional block storage cost, provisioned IOPS, CPU burst credits, RI adjusters and OD adjusters, for each cloud user or cloud account. For example, the CUL 200 may sum the consumption measurements with Equation 7 below.

(Σ(Equation 1-Equation 6)+Other additional service costs (SAP Enhanced Monitoring+DB Administration+Other Tools Stack))*([1+λ]*[1−γ]*[1+
Q ]*[1+ζ]*[1+τ]*[1+ψ]*[1+θ]*[1+χ]))*Appropriate Foreign Exchange→Equation 7

Where:

λ=Enterprise Support Fee (%)

γ=Cloud Provider Discount (%)

Q =Cloud Management Charges (%)

ζ=FX Risk (%)

τ=PMO Contingency (%)

ψ=Capital Charges−Late Payment (%)

θ=ACP CMS/Service Desk (%)

χ=Margin/PMO (%)

Referring to the pre-prescriptive analysis layer 160 in FIG. 1, after generating the consumption preview 152 at the CUE engine layer 150, the CUL 200 may apply a filter metric based on the consumption preview 152 to mark computing resources for exclusion from prescriptive utilization processing at the pre-prescriptive layer 160 (270).

Specifically, the CUL 200 may determine a preservation exclusion threshold and a corrective exclusion threshold (271) and access the consumption preview 152 via interaction with the data-staging layer 105 (272). Then, the CUL 200 may determine a preservable computing resource 162 from the clod computing resources based on the consumption preview 152 (273). The preservable computing resource 162 has a preservable utilization within the preservation exclusion threshold for the CUE interval. In other words, the preservable computing resource 162 is utilized as expected, therefore the prescriptive utilization processing is not necessary for the resource.

In some implementations, the CUL 200 may determine a computing instance such as a CPU to be a preservable computing resource 162 based on the CPU performance metrics. For example, if the preservation exclusion threshold is the minimum CPU utilization threshold to be considered for exclusion from rightsizing and the actual utilization of the CPU is more than the minimum CPU utilization threshold, the CUL 200 may determine the CPU to be a preservable computing resource 162 that can be excluded from rightsizing. For another example, if the preservation exclusion threshold is the minimum CPU utilization threshold (typically 60%) to be considered for exclusion from power scheduling and the actual utilization of the CPU is more than the minimum CPU utilization threshold, the CUL 200 may determine the CPU to be a preservable computing resource 162 that can be excluded from power scheduling.

In some implementations, the CUL 200 may determine a computing instance such as virtual machine or database to be a preservable computing resource 162 based on the rightsizing history of the computing instance. For example, if the computing instance has been rightsized during the CUE interval, then rightsizing is not needed and the computing instance is the preservable computing resource 162. Below is exemplary logic to determine if the computing instance has been rightsized:

IF(VM/Database="OnDemand",IF(ζ(1)≠ζ(2) THEN "VM/Database is RightSized" ELSE VM/Database is NOT RightSized) VM/Database is NOT RightSized)

Where,

ζ(1)=VM/DB Size on Billing START Date

ζ(2)=VM/DB Size on Billing END Date

Then, the CUL 200 may mark the preservable computing resource 162 for preservation in its current requisition state (275). This current requisition state may refer to the volume of the preservable computing resource 162 that the cloud account or cloud user currently occupies.

Similarly, the CUL 200 may determine a correctable computing resource 164 from the cloud computing resources based on the consumption preview 152 (274). The correctable computing resource 164 has a correctable utilization outside the correction exclusion threshold for the CUE interval. For example, if the correctable computing resource 164 is clearly under-utilized, the resource needs to be adjusted. As such, it is not necessary for the prescriptive utilization processing to determine whether the adjustment for the resource is needed and the resource may thus be excluded from the prescriptive utilization processing.

For example, the correction exclusion threshold is the minimum up-time (i.e. the number of running hours/number of available hours) threshold that a reserved instance will be considered for inclusion for RI analysis. If the actual average up-time for the reserved instance is less than the correction exclusion threshold, the CUL 200 may determine that the reserved instance is a correctable computing resource 164, and thereby exclude it from the RI analysis.

Then, the CUL 200 may mark the correctable computing resource 164 for adjustment relative to its current requisition state (276). This current requisition state may refer to the volume of the correctable computing resource 164 that the cloud account or cloud user currently occupies.

Finally, the CUL 200 may mark the preservable computing resource 162 and the correctable computing resource 164 for exclusion from prescriptive utilization processing (277).

After applying a filter metric to mark computing resources for exclusion from prescriptive utilization processing at 270, the CUL 200 may initiate prescriptive utilization processing on the set of computing resources without computing resources marked for exclusion (280). The prescriptive utilization processing may include, for example, prescriptions for placement of individual stored items in cloud storages such as described in U.S. patent application Ser. No. 16/219,435, filed Dec. 13, 2018, and entitled Prescriptive Analytics Based Storage Class Placement Stack for Cloud Computing, which is incorporated by reference herein in its entirety. Additionally or alternatively, the prescriptive utilization processing may include, preparation for implementation the cloud computing resource control tools or the underlying prescriptive analyses (with or without the domain presentation frontend) as discussed in U.S. patent application Ser. No. 15/925,075, filed Mar. 19, 2018, and entitled Resource Control Stack Based System for Multiple Domain Presentation of Cloud Computing Resource Control, which is incorporated by reference in its entirety.

Figure 3:
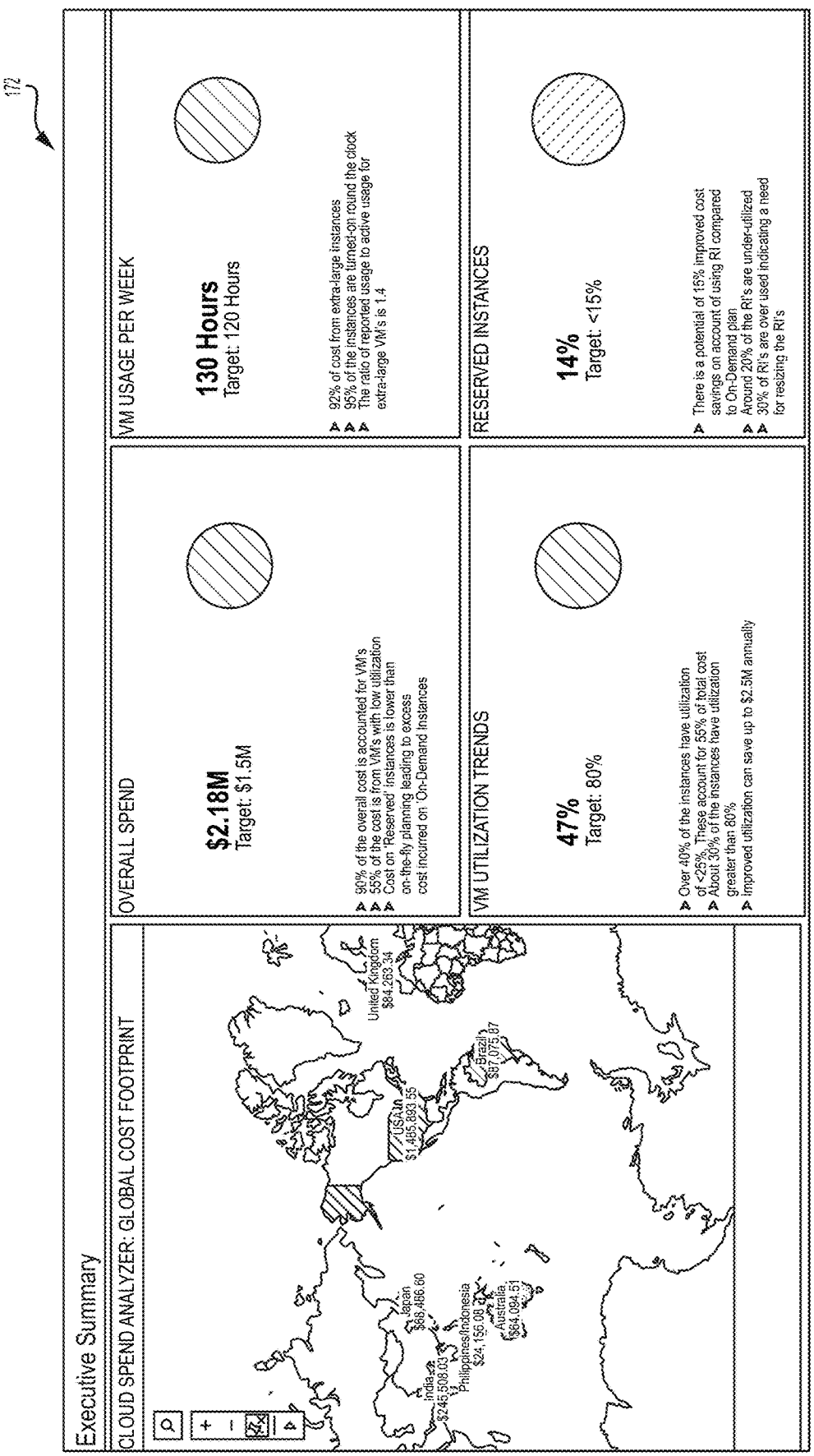
FIG. 3 illustrates an example consumption unit estimation control interface.
Figure 4:
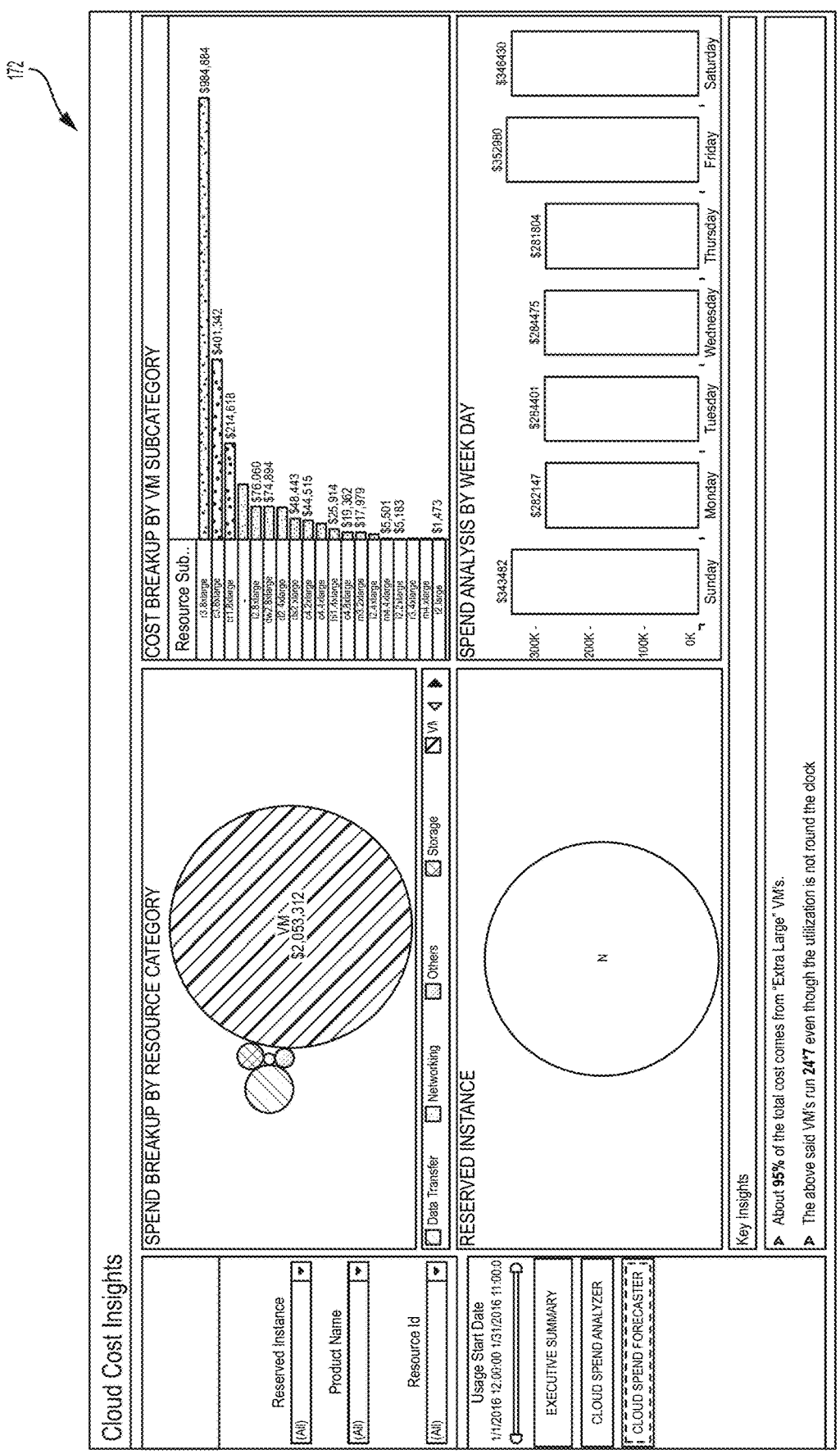
FIG. 4 illustrates a second example consumption unit estimation control interface.
Figure 5:
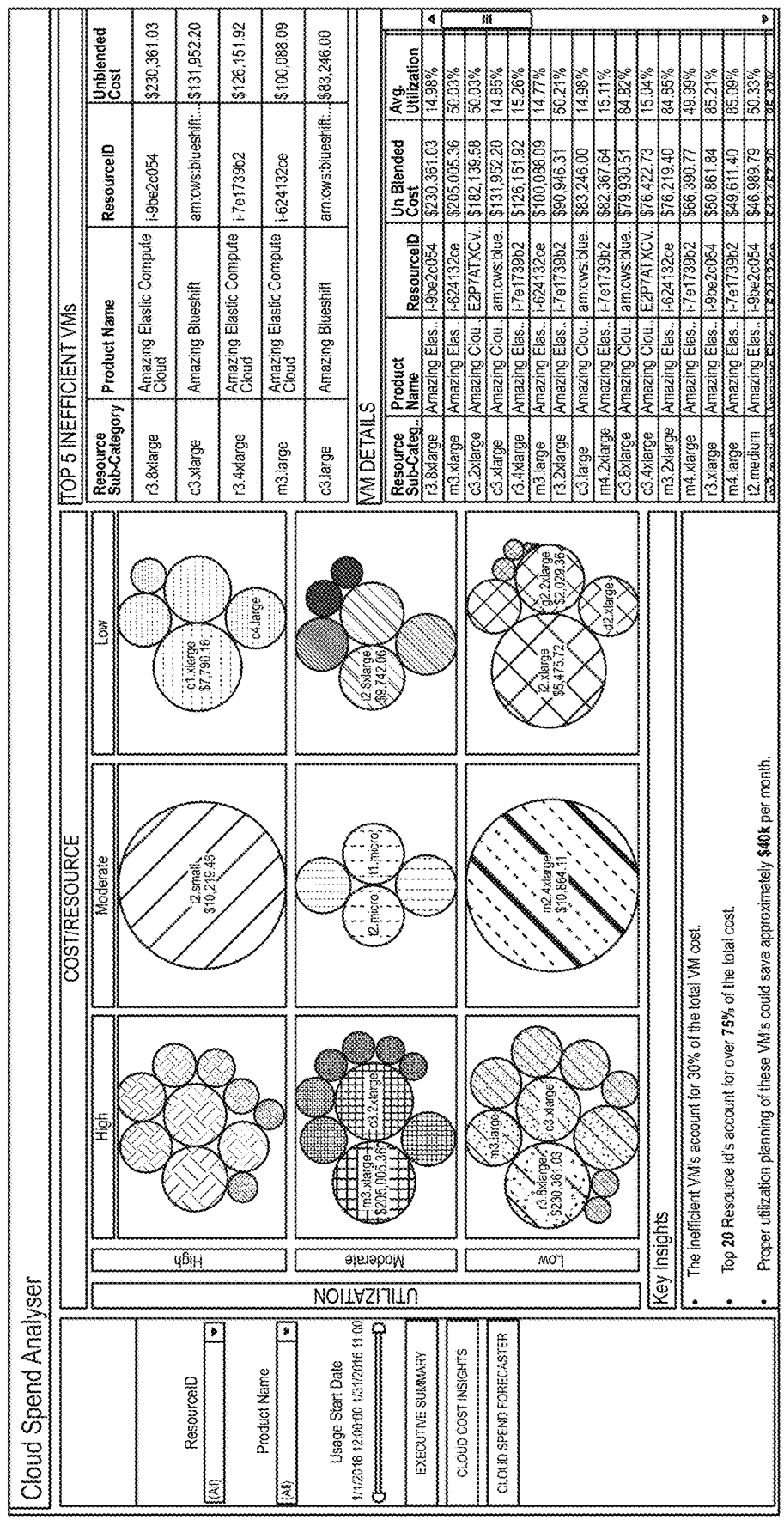
FIG. 5 illustrates a third example consumption unit estimation control interface.

Optionally, at the presentation layer 170, the CUL 200 may access the consumption preview 152 from the CUE engine layer 150, e.g., via data-staging layer 105 memory operations to generate a CUE-control interface 172 including a CUE-window presentation 174 (290). The CUE-window presentation 174 may be configured to display at least a portion of the consumption preview. As shown in FIGS. 3 through 5, the CUE-window presentation 174 may display various views with respect to the consumption preview with different granularities and at different levels. In particular, FIG. 3 illustrates the overall consumption summary for the cloud computing resources including, for example, the overall spending, the virtual machine usage per week, the virtual machine utilization trends, and reserved instances. FIG. 4 illustrates the cost insight of the cloud computing resources, where the cloud user may get a clear view of the allocation and distribution of costs by resources, sub categorizations of these resources, desired time stamps, the rate card, and other consumption estimation information. FIG. 5 illustrates a cloud computing resources consumption analyzer, which may help the cloud user to drill down the data and compare the utilization with cost per various cloud resources.

Figure 6:
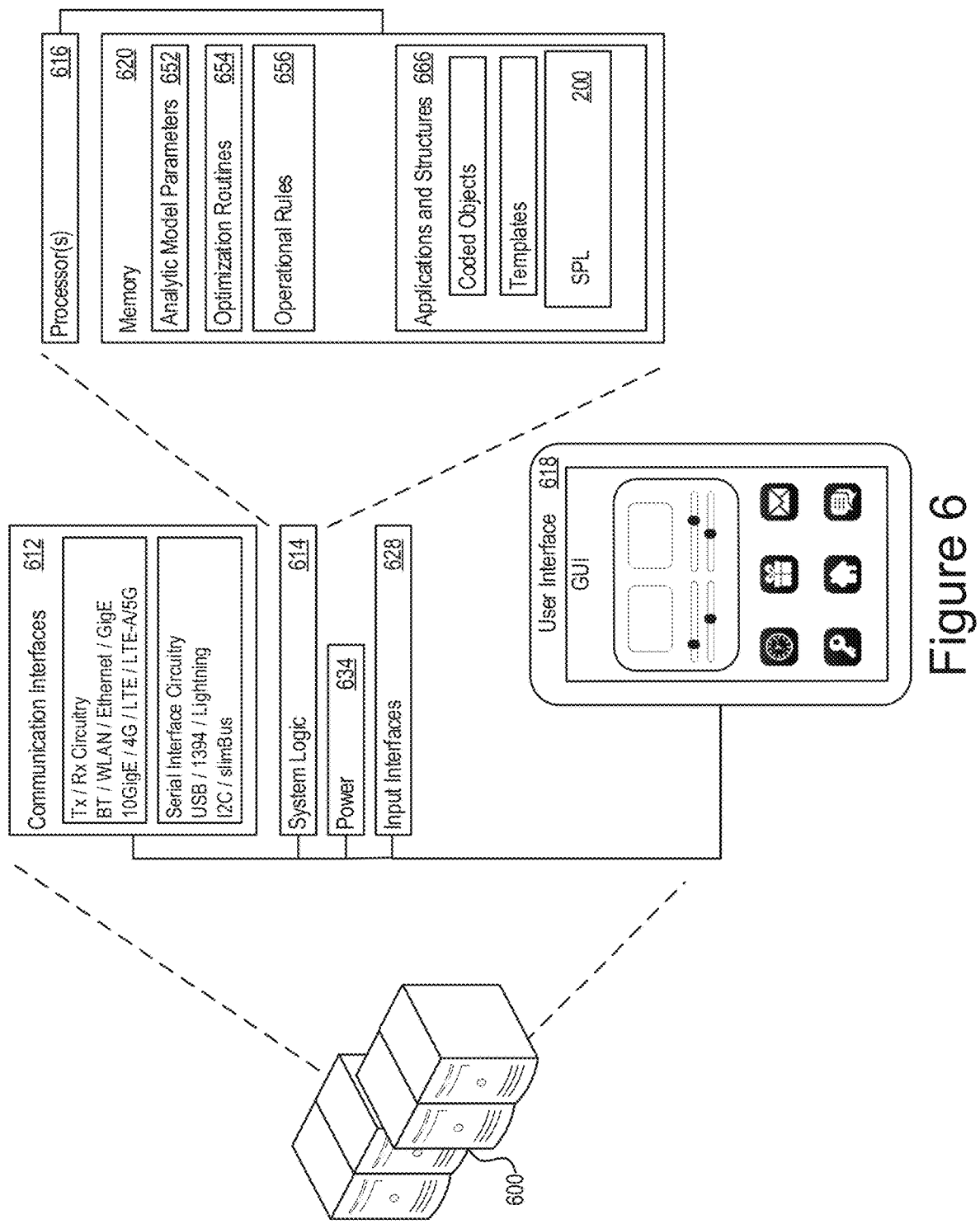
FIG. 6 illustrates an example specific execution environment for the consumption unit estimation stack of FIG. 1.

FIG. 6 shows an example specific execution environment 600 for the CUE stack 100 described above. The execution environment 600 may include system logic 614 to support execution of the multiple layers of CUE stack 100 described above. The system logic may include processors 616, memory 620, and/or other circuitry.

The memory 620 may include analytic model parameters 652, optimization routines 654, and operational rules 656. The memory 620 may further include applications and structures 666, for example, coded objects, machine instructions, templates, or other structures to support generation of consumption preview, processing to apply filter metrics, or other tasks described above. The applications and structures may implement the CUL 200.

The execution environment 600 may also include communication interfaces 612, which may support wireless, e.g. Bluetooth, Wi-Fi, WLAN, cellular (4G, 5G), and/or wired, Ethernet, Gigabit Ethernet, optical networking protocols. The communication interfaces 612 may also include serial interfaces, such as universal serial bus (USB), serial ATA, IEEE 1394, lighting port, I$^2$C, slimBus, or other serial interfaces. The communication interfaces 612 may be used to support and/or implement remote operation of the CUE-control interface 172. The execution environment 600 may include power functions 634 and various input interfaces 628. The execution environment may also include a user interface 618 that may include human-to-machine interface devices and/or graphical user interfaces (GUI). The user interface 618 may be used to support and/or implement local operation of the CUE-control interface 172. In various implementations, the system logic 614 may be distributed over one or more physical servers, be implemented as one or more virtual machines, be implemented in container environments such as Cloud Foundry or Docker, and/or be implemented in Serverless (functions as-a-Service) environments.

In some cases, the execution environment 600 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the CUE stack 100, of the execution environment onto the hardware resources. In some cases, a manifest may be stored as a preference file such as a YAML (yet another mark-up language), JSON, or other preference file type. Additionally or alternatively, the manifest may include custom scripts to implement the CUE stack 100 in a serverless environment, for example, using the multiple-tier multiple-node serverless framework described in U.S. patent application Ser. No. 16/159,399, filed 12 Oct. 2018, and entitled Distributed Multiple Tier Multi-Node Serverless Framework for Complex Analytics Task Execution, which is incorporated by reference herein in its entirety. Therein, a multiple-tier framework is described. The framework describes a series of the serverless tasks controlled via scripts. The serverless tasks overlap in execution to maintain continuity across the tasks. The computational task is divided into chunks that may be handled by individual serverless tasks. Accordingly, a complex analytic process, such as those describe in this disclosure, may be divided into chunks and executed over one or more overlapping serverless tasks.

Figure 7:
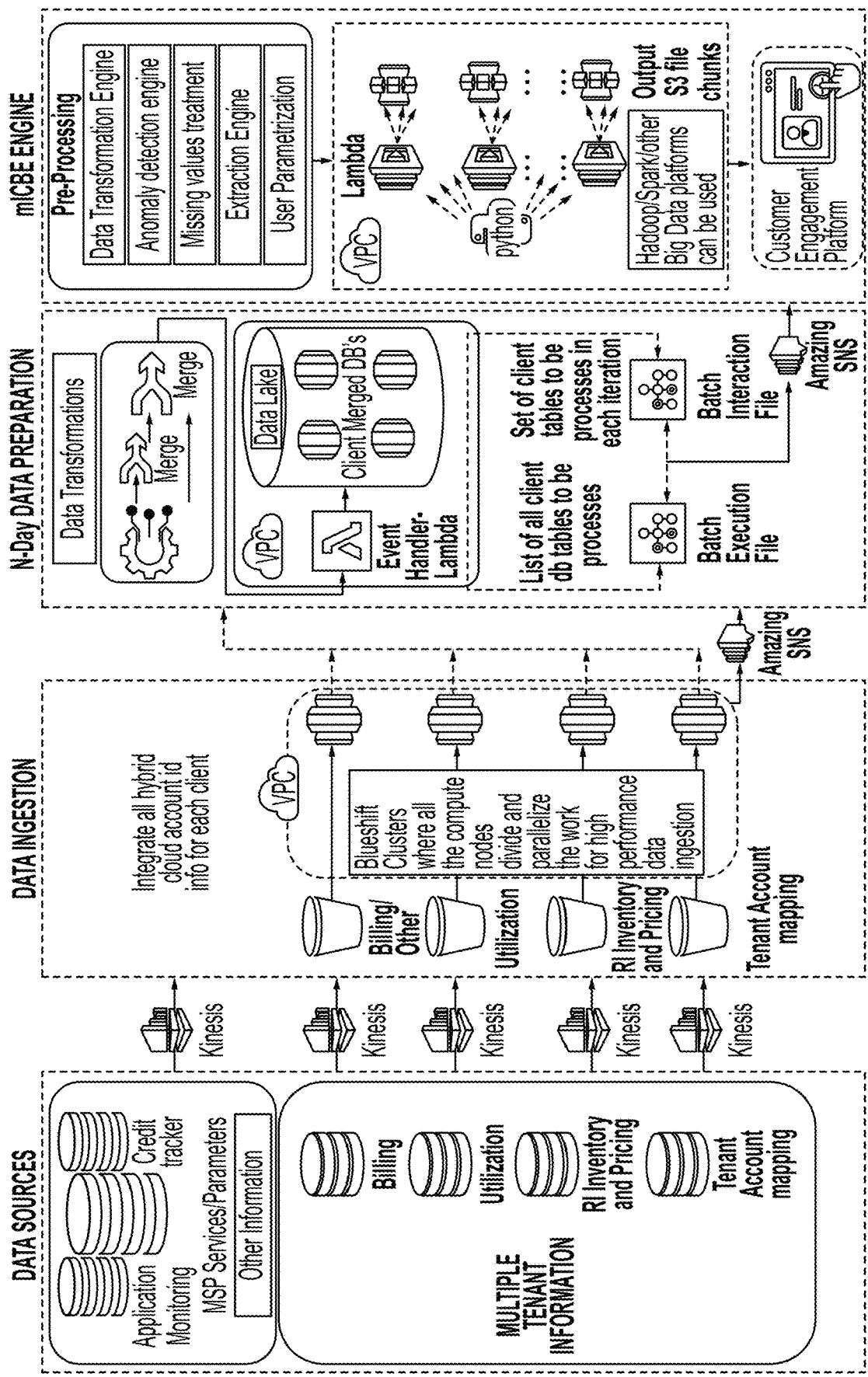
FIG. 7 illustrates an example specific cloud-based system implementing the multiple-layer consumption unit estimation stack in accordance with an embodiment.

FIG. 7 shows an example cloud-based architecture 700 implementing the multiple-layer CUE stack 100. Multiple enterprise level cloud users may acquire and consume a huge amount of cloud computing resources, thereby generating a high volume of records with respect to the consumption of cloud computing resources as the input data for consumption unit estimation. A typical cloud bill for a cloud user with 1000 virtual machines would run into 6 million monthly records. Most cloud managed service providers (MSPs) have cloud users running into hundreds. In order to obtain the massive input data efficiently, the architecture 700 retrieve the input data from various data sources in parallel. For example, as shown in FIG. 7, the cloud computing resource utilization data, the cloud computing resource reservation data, the billing data, and the cloud user account mapping data are concurrently read into respective Simple Storage Buckets. The architecture 700 may utilize the Big Data Lake to implement the capacity to read the input data from any type of storage including, for example, S3, Secured Storage, Hadoop file systems (HDFS) connections, relation databases, flat files and/or the like.

Modern data lakes use extract, transform, and load (ETL) operations to convert bulk information into usable data. To achieve high performance of data ingestion and transformations, the architecture 700 may ingest the input data into cloud-based database platforms such as AWS Redshift and then utilize cloud-based serverless/batch computing services, such as n-Tier AWS Lambda plus R/Python Batch processing, to process the input data to implement the functions of the CUE stack 100. As such, the architecture 700 may be implemented in a scalable way.

As a result of the high-performance data ingestion, the architecture 700 may generate the consumption preview for approximately 1000 virtual machines in less than 5 minutes. In the traditional set-up, it would take over 2 days. In combination with the utilization of AWS Batch and n-Tier AWS Lambda, the architecture 700 would process multiple cloud user data seamless in close to real-time.

Optionally, the architecture 700 may provide a customer engagement platform, which may allow the cloud user or operator to pre-define the financial constraints/thresholds and other values so as to enable the customized tuning for consumption unit estimation.

Figure 8A:
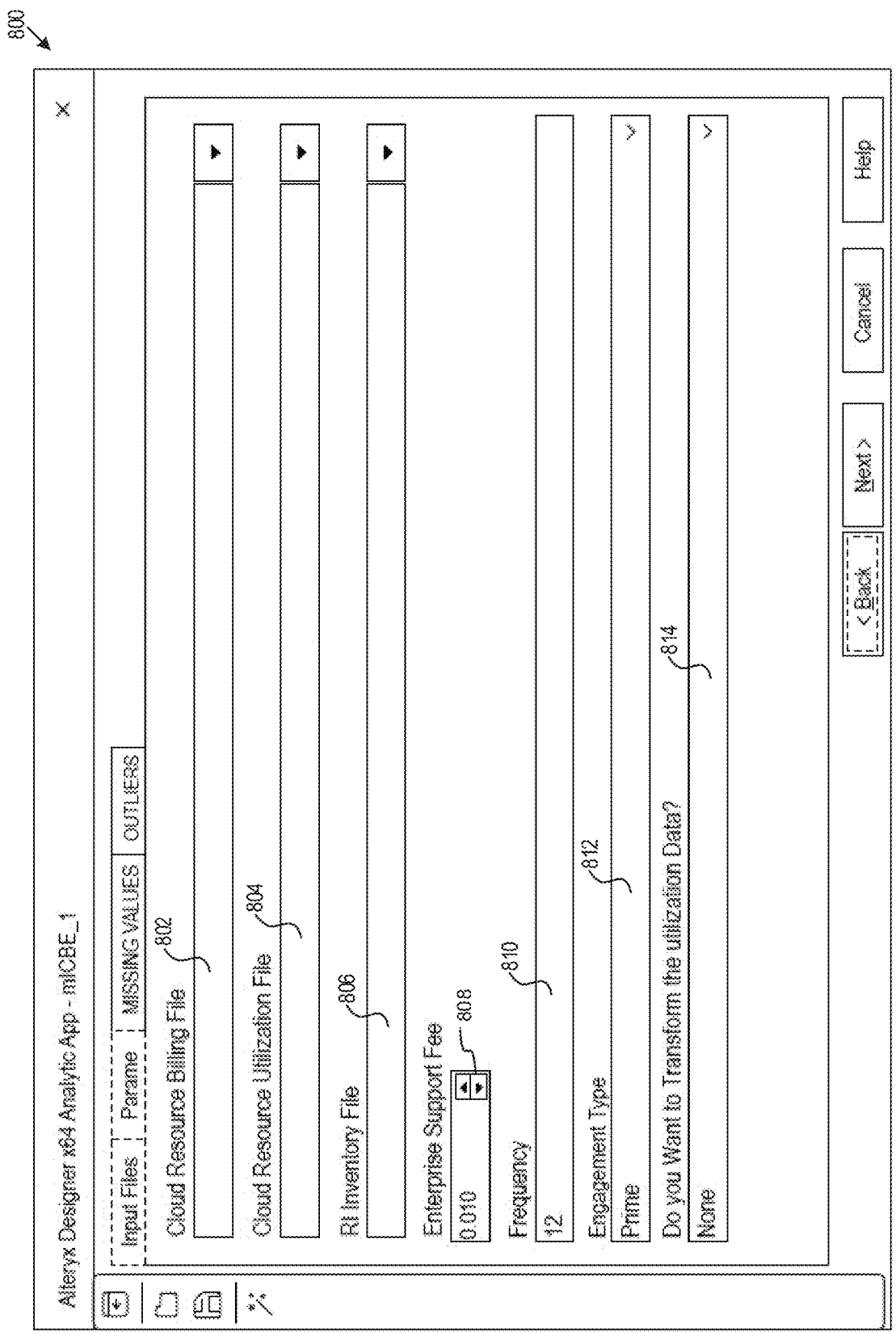

Aside from the CUE-control interfaces 172 providing consumption preview with reference to FIGS. 3 through 5, referring to FIGS. 8A through 8D, another example CUE-control interface 800 is shown. In FIG. 8A, the CUE-control interface 800 includes an example SCP-window presentation as discussed above. The SCP-window presentation may include the selectable options and input option with respect to the input data, including the data sources for the computing resource utilization data 804, the computing resource consumption data 802, and the computing resource reservation data 806; the frequency to perform the consumption unit estimation 810; the engagement type of the cloud user 812; as well as whether to transform the utilization data 814.

Figure 8B:
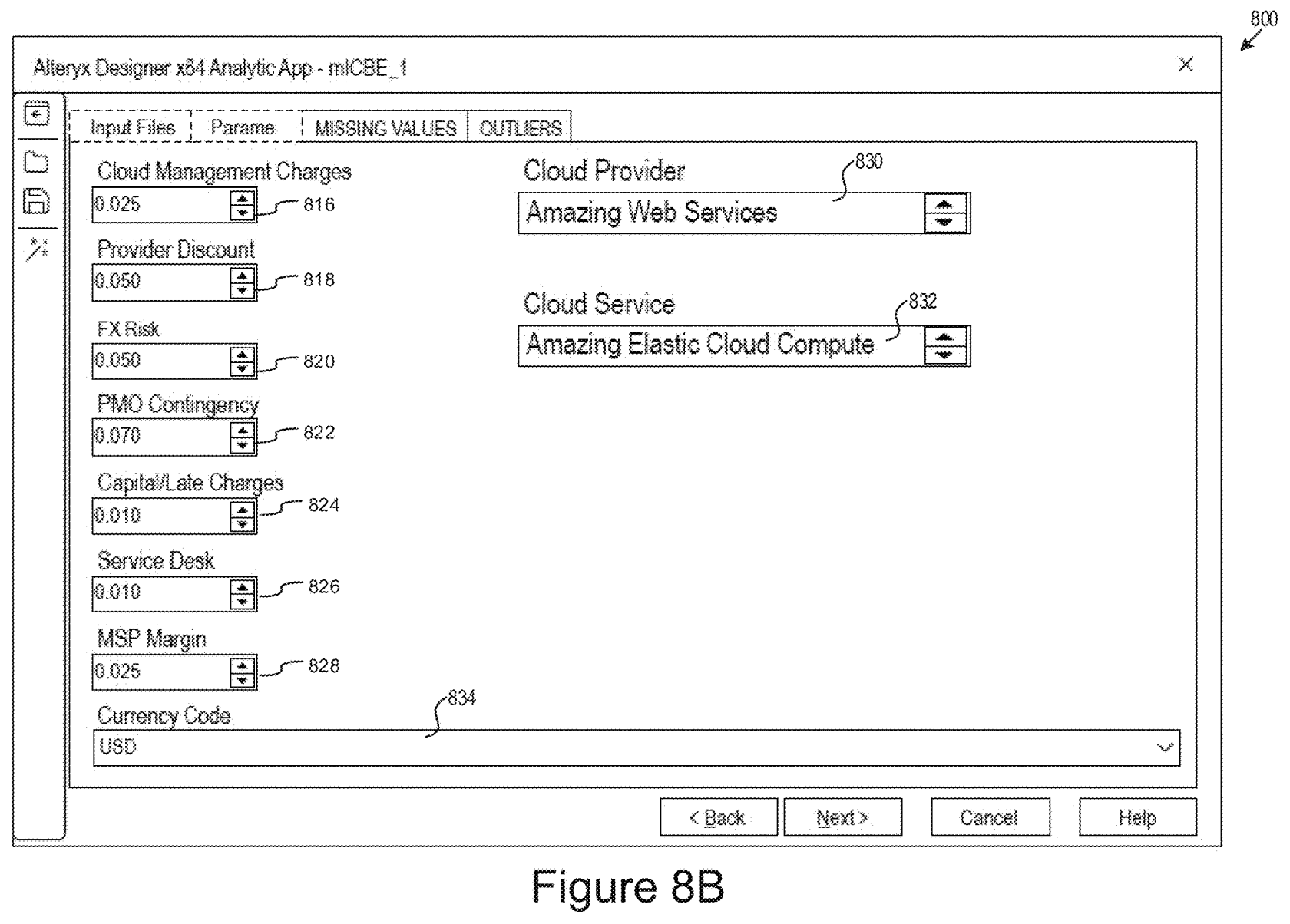

In the example CUE-control interface 800 of FIG. 8B, the example SCP-window presentation may provide selectable options for financial parameters, including Cloud Management Charges (%) 816, Provider Discount 818, FX Risk (%) 820, PMO Contingency (%) 822, Capital Charges–Late Payment (%) 824, Service Desk (%) 826, Margin/PMO (%) 828, Currency Code 834. Additionally, the SCP-window presentation may include selectable options of Cloud Provider 830 and Cloud Service 832. Via the Cloud Provider 830, the operator may choose multiple cloud providers for cloud users who are on multiple public clouds. The Cloud Service 832 indicates whether the cloud user wants to export the analysis for one, multiple or all the available cloud services.

Figure 8C:
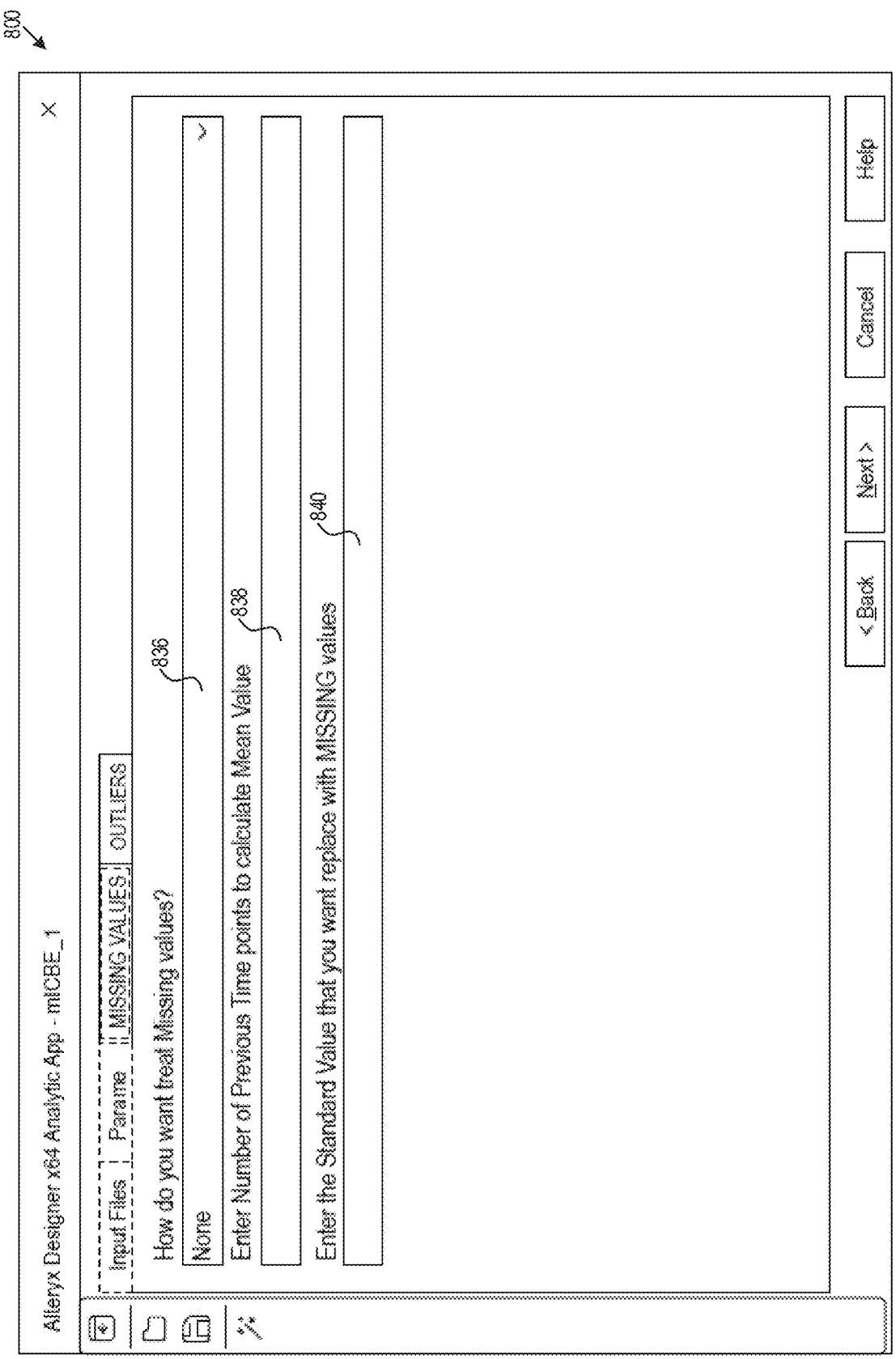
Figure 8D:
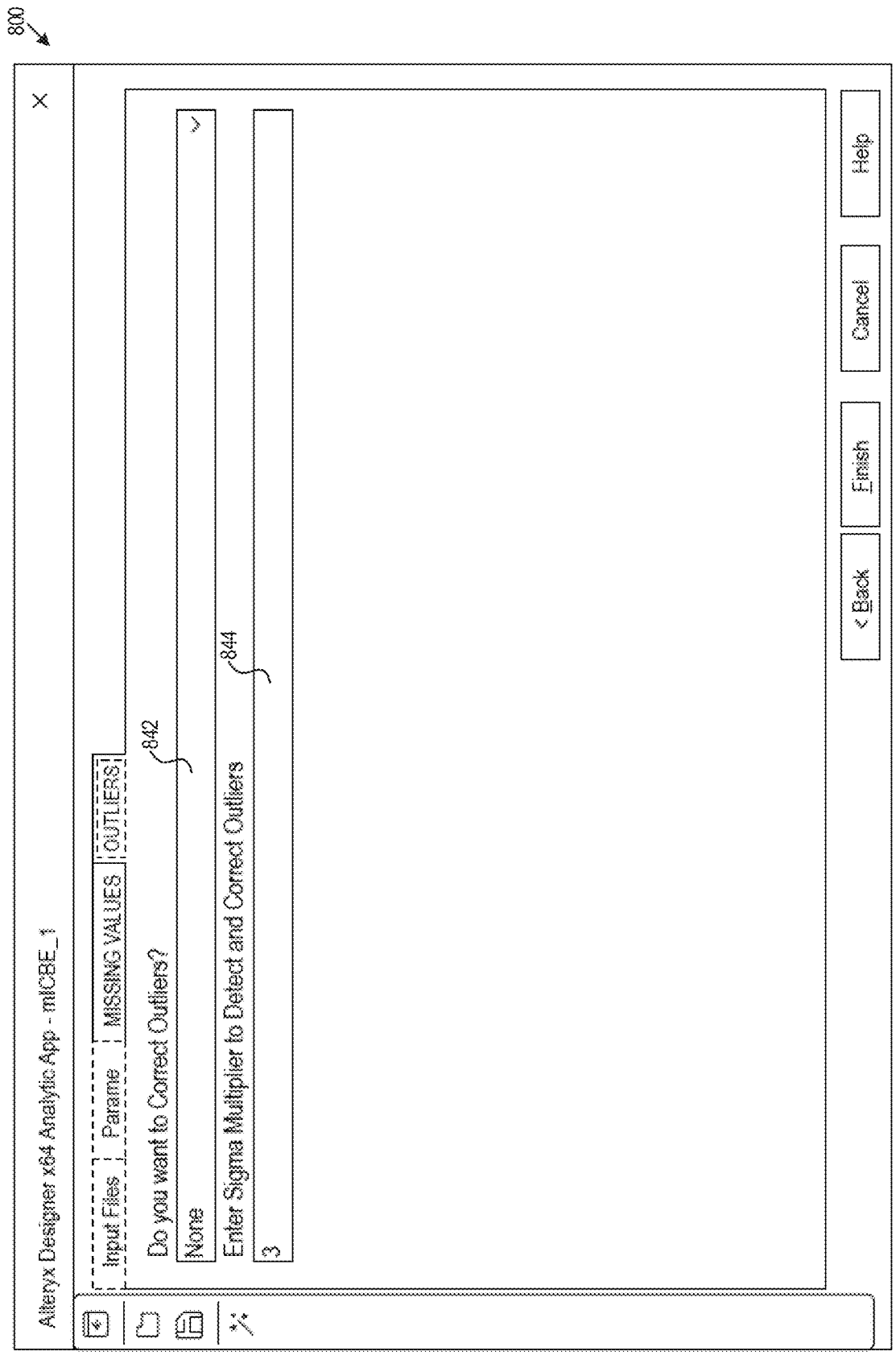

In the example CUE-control interface 800 of FIGS. 8C and 8D, the example SCP-window presentation may include the selectable options and input options allowing the cloud user to determine how to treat missing data values 836, 838, and 840 as well as how to correct outlier data 842 and 844.

The cloud framework of the architecture 700 may hide the technological complexity from the cloud user and enable enhanced flexibility including ease-of-use, infrastructure and location independence. In addition, a high degree of this virtualization may help in realizing economies of scale and reducing the service delivery cost.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations as described below may use the techniques and architectures described above.

A1 In an example, A system includes: network interface circuitry configured to establish a communication link to a computing resource utilization tracking data source for a set of computing resources; and consumption unit estimation (CUE) circuitry in data communication with the network interface circuitry, the CUE circuitry configured to: at an input layer of a CUE stack configured to execute on the CUE circuitry: obtain, via the networking interface circuitry, computing resource utilization tracking data for a set of computing resources; obtain consumption metric data; obtain, via the networking interface circuitry, application execution tracking data for the set of computing resources; and obtain computing resource reservation data; and store the computing resource utilization tracking data, consumption metric data, application execution tracking data, and computing resource reservation data via a storage operation at a data-staging layer of the CUE stack; at a configuration layer of the CUE stack: determine a CUE interval; and determine consumption metric modifiers for a selected identity associated with the set of computing resources; at a CUE engine layer of the CUE stack: for the CUE interval, generate a consumption preview by: advancing, according to the CUE interval, a dynamic consumption credit input/output (I/O) flow analysis; and based on the computing resource utilization tracking data and the application execution tracking data, executing a direct utilization consumption determination and applying the consumption metric data to the direct utilization consumption determination; at a pre-prescriptive analysis layer of the CUE stack: apply a filter metric by: determining a preservation exclusion threshold and a corrective exclusion threshold; accessing, via interaction with the data-staging layer, the consumption preview; based on the consumption preview, determining a preservable computing resource from the set of computing resources, the preservable computing resource having a preservable utilization within the preservation exclusion threshold for the CUE interval; based on the consumption preview, determining a correctable computing resource from the set of computing resources, the correctable computing resource having a correctable utilization outside the correction exclusion threshold for the CUE interval; marking the preservable computing resource for preservation in a current requisition state; marking the correctable computing resource for adjustment relative to the current requisition state; and marking the preservable computing resource and the correctable computing resource for exclusion from pre-scriptive utilization processing; and initiate the prescriptive utilization processing on the set of computing resources without computing resources marked for exclusion.

A2 The system of example A1, where the CUE stack further includes a presentation layer configured to generate a CUE-control interface including a CUE window configured to display at least a portion of the consumption preview.

A3 The system of either of examples A1 or A2, where the CUE stack further includes a presentation layer configured to generate a CUE-control interface including a CUE interval selection control configured to accept a selection of the CUE interval from an operator.

A4 The system of any of examples A1-A3, where the CUE interval corresponds to generation of consumption previews periodically, non-periodically, at operator selected intervals, or any combination thereof.

A5 The system of any of examples A1-A4, where the CUE circuitry is configured to advance the dynamic consumption credit I/O flow analysis by: determining an input rate of credits based on an instance size for a first resource of the set of computing resources; determining an output rate of credits based on the computing resource utilization tracking data; and comparing the input and output rates to determine a credit accumulation.

A6 The system of example A5, where the CUE circuitry is configured to drop any accumulated credits above a predetermined instantaneous computational capacity for the instance size.

A7 The system of any of examples A1-A6, where the CUE circuitry is configured to distinguish between reserved computing resources and on-demand computing resources before performing the dynamic consumption credit VO flow analysis.

A8 The system of example A7, where the CUE circuitry is configured to generate the consumption preview by executing reserved instance adjusters for instances the reserved computing resources based on the computing resource reservation data.

A9 The system of either of examples A7 or A8, where in response that instances of the on-demand computing resources are mischaracterized as the reserved computing resources, the CUE circuitry is configured to generate the consumption preview by executing reserved instance adjusters for the instances based on the computing resource reservation data.

A10 The system of any of examples A7-A9, where in response that instances of the reserved computing resources are mischaracterized as the on-demand computing resources, the CUE circuitry is configured to generate the consumption preview by executing on-demand adjusters for the instances based on the computing resource utilization tracking data and executing reserved instance adjusters for the instances based on the computing resource reservation data.

A11 The system of any of examples A1-A10, where the CUE circuitry is configured to apply the direct utilization consumption determination to generate an estimated snapshot for a block storage resource of the computing resources.

A12 The system of example A11, where the CUE circuitry is further configured to sum estimated snapshots to generate the consumption preview.

A13 The system of any of examples A1-A12, where the CUE circuitry is configured to validate the computing resource utilization tracking data and the application execution tracking data, and generate the consumption preview by executing the direct utilization consumption determination based on the validated computing resource utilization tracking data and the validated application execution tracking data.

A14 The system of any of examples A1-A13, where the CUE circuitry is configured to validate the computing resource utilization tracking data and the application execution tracking data by: performing data transformations on the computing resource utilization tracking data and the application execution tracking data and treating outlier data, anomaly data, and missing value data in the computing resource utilization tracking data and the application execution tracking data.

A15 The system of any of examples A1-A14, where the computing resource utilization tracking data and the application execution tracking data originate from heterogeneous data sources.

B1 In an example a method includes: at network interface circuitry: establishing a communication link to a computing resource utilization tracking data source for a set of computing resources; at consumption unit estimation (CUE) circuitry in data communication with the network interface circuitry, the CUE circuitry executing a CUE stack: obtaining, at an input layer of the CUE stack, computing resource utilization tracking data for a set of computing resources via the networking interface circuitry; obtaining, at the input layer, consumption metric data; obtaining, at the input layer, application execution tracking data for the set of computing resources via the networking interface circuitry; obtaining, at the input layer, computing resource reservation data; storing, at the input layer, the computing resource utilization tracking data, consumption metric data, application execution tracking data, and computing resource reservation data via a storage operation at a data-staging layer of the CUE stack; determining, at a configuration layer of the CUE stack, a CUE interval; determining, at the configuration layer, consumption metric modifiers for a selected identity associated with the set of computing resources; for the CUE interval, generating, at a CUE engine layer of the CUE stack, a consumption preview by: advancing, according to the CUE interval, a dynamic consumption credit input/output (I/O) flow analysis; and based on the computing resource utilization tracking data and the application execution tracking data, executing a direct utilization consumption determination and applying the consumption metric data to the direct utilization consumption determination; applying, at a pre-prescriptive analysis layer of the CUE stack, a filter metric by: determining a preservation exclusion threshold and a corrective exclusion threshold; accessing, via interaction with the data-staging layer, the consumption preview; based on the consumption preview, determining a preservable computing resource from the set of computing resources, the preservable computing resource having a preservable utilization within the preservation exclusion threshold for the CUE interval; based on the consumption preview, determining a correctable computing resource from the set of computing resources, the correctable computing resource having a correctable utilization outside the correction exclusion threshold for the CUE interval; marking the preservable computing resource for preservation in a current requisition state; marking the correctable computing resource for adjustment relative to the current requisition state; and marking the preservable computing resource and the correctable computing resource for exclusion from pre-scriptive utilization processing; and initiating, at a pre-prescriptive analysis layer, the prescriptive utilization processing on the set of computing resources without computing resources marked for exclusion.

B2 The method of example B1, where executing a CUE stack further comprises generating, at a presentation layer of the CUE stack, a CUE-control interface including a CUE window configured to display at least a portion of the consumption preview.

B3 The method of either of examples B1 or B2, where executing a CUE stack further comprises generating, at a presentation layer of the CUE stack, a CUE-control interface including a CUE interval selection control configured to accept a selection of the CUE interval from an operator.

B4 The method of any of examples B1-B3, where the input layer and the CUE engine layer are deployed as cloud based execution platforms and the data-staging layer is deployed as a cloud based database platform.

C1 In an example, a product includes: machine-readable media other than a transitory signal; and instructions stored on the machine-readable media, the instructions configured to, when executed, cause a machine to: at network interface circuitry: establish a communication link to a computing resource utilization tracking data source for a set of computing resources; at consumption unit estimation (CUE) circuitry in data communication with the network interface circuitry, the CUE circuitry executing a consumption unit estimation stack: obtain, at an input layer of the CUE stack, computing resource utilization tracking data for a set of computing resources via the networking interface circuitry; obtain, at the input layer, consumption metric data; obtain, at the input layer, application execution tracking data for the set of computing resources via the networking interface circuitry; obtain, at the input layer, computing resource reservation data; store, at the input layer, the computing resource utilization tracking data, consumption metric data, application execution tracking data, and computing resource reservation data via a storage operation at a data-staging layer of the CUE stack; determine, at a configuration layer of the CUE stack, a CUE interval; determine, at the configuration layer, consumption metric modifiers for a selected identity associated with the set of computing resources; for the CUE interval, generate, at a CUE engine layer of the CUE stack, a consumption preview by: advancing, according to the CUE interval, a dynamic consumption credit input/output (I/O) flow analysis; and based on the computing resource utilization tracking data and the application execution tracking data, executing a direct utilization consumption determination and applying the consumption metric data to the direct utilization consumption determination; apply, at a pre-prescriptive analysis layer of the CUE stack, a filter metric by: determining a preservation exclusion threshold and a corrective exclusion threshold; accessing, via interaction with the data-staging layer, the consumption preview; based on the consumption preview, determining a preservable computing resource from the set of computing resources, the preservable computing resource having a preservable utilization within the preservation exclusion threshold for the CUE interval; based on the consumption preview, determining a correctable computing resource from the set of computing resources, the correctable computing resource having a correctable utilization outside the correction exclusion threshold for the CUE interval; marking the preservable computing resource for preservation in a current requisition state; marking the correctable computing resource for adjustment relative to the current requisition state; and marking the preservable computing resource and the correctable computing resource for exclusion from prescriptive utilization processing; and initiate, at a pre-prescriptive analysis layer, the prescriptive utilization processing on the set of computing resources without computing resources marked for exclusion.

D1 A method implemented by operation of a system of any of examples A1-A15.

E1 A product comprising instructions stored on a machine readable medium, the instructions configured to cause a machine to implement the method of example D1.

Various implementations have been specifically described. However, many other implementations are also possible.

What is claimed is:
1. A system including:
network interface circuitry configured to establish a communication link to a computing resource utilization tracking data source for a set of computing resources; and
consumption unit estimation (CUE) circuitry in data communication with the network interface circuitry, the CUE circuitry configured to:
 at an input layer of a CUE stack configured to execute on the CUE circuitry:
  obtain, via the networking interface circuitry, computing resource utilization tracking data for a set of computing resources;
  obtain consumption metric data;
  obtain, via the networking interface circuitry, application execution tracking data for the set of computing resources;
  obtain computing resource reservation data; and
  store the computing resource utilization tracking data, consumption metric data, application execution tracking data, and computing resource reservation data via a storage operation at a data-staging layer of the CUE stack;
 at a configuration layer of the CUE stack:
  determine a CUE interval; and
  determine consumption metric modifiers for a selected identity associated with the set of computing resources;
 at a CUE engine layer of the CUE stack:
  for the CUE interval, generate a consumption preview by:

advancing, according to the CUE interval, a dynamic consumption credit input/output (I/O) flow analysis; and based on the computing resource utilization tracking data and the application execution tracking data, executing a direct utilization consumption determination and applying the consumption metric data to the direct utilization consumption determination;

at a pre-prescriptive analysis layer of the CUE stack:
apply a filter metric by:
determining a preservation exclusion threshold and a corrective exclusion threshold;
accessing, via interaction with the data-staging layer, the consumption preview;
based on the consumption preview, determining a preservable computing resource from the set of computing resources, the preservable computing resource having a preservable utilization within the preservation exclusion threshold for the CUE interval;
based on the consumption preview, determining a correctable computing resource from the set of computing resources, the correctable computing resource having a correctable utilization outside the correction exclusion threshold for the CUE interval;
marking the preservable computing resource for preservation in a current requisition state;
marking the correctable computing resource for adjustment relative to the current requisition state; and
marking the preservable computing resource and the correctable computing resource for exclusion from prescriptive utilization processing; and
initiate the prescriptive utilization processing on the set of computing resources without computing resources marked for exclusion.

2. The system of claim 1, where the CUE stack further includes a presentation layer configured to generate a CUE-control interface including a CUE window configured to display at least a portion of the consumption preview.

3. The system of claim 1, where the CUE stack further includes a presentation layer configured to generate a CUE-control interface including a CUE interval selection control configured to accept a selection of the CUE interval from an operator.

4. The system of claim 1, where the CUE interval corresponds to generation of consumption previews periodically, non-periodically, at operator selected intervals, or any combination thereof.

5. The system of claim 1, where the CUE circuitry is configured to advance the dynamic consumption credit I/O flow analysis by:
determining an input rate of credits based on an instance size for a first resource of the set of computing resources;
determining an output rate of credits based on the computing resource utilization tracking data; and
comparing the input and output rates to determine a credit accumulation.

6. The system of claim 5, where the CUE circuitry is configured to drop any accumulated credits above a predetermined instantaneous computational capacity for the instance size.

7. The system of claim 1, where the CUE circuitry is configured to distinguish between reserved computing resources and on-demand computing resources before performing the dynamic consumption credit I/O flow analysis.

8. The system of claim 7, where the CUE circuitry is configured to generate the consumption preview by executing reserved instance adjusters for instances of the reserved computing resources based on the computing resource reservation data.

9. The system of claim 7, where in response to instances of the on-demand computing resources being mischaracterized as the reserved computing resources, the CUE circuitry is configured to generate the consumption preview by execution of reserved instance adjusters for the instances based on the computing resource reservation data.

10. The system of claim 7, where in response to instances of the reserved computing resources being mischaracterized as the on-demand computing resources, the CUE circuitry is configured to generate the consumption preview by execution of on-demand adjusters for the instances based on the computing resource utilization tracking data and executing reserved instance adjusters for the instances based on the computing resource reservation data.

11. The system of claim 1, where the CUE circuitry is configured to apply the direct utilization consumption determination to generate an estimated snapshot for a block storage resource of the computing resources.

12. The system of claim 11, where the CUE circuitry is further configured to sum estimated snapshots to generate the consumption preview.

13. The system of claim 1, where the CUE circuitry is configured to:
validate the computing resource utilization tracking data and the application execution tracking data, and
generate the consumption preview by execution of the direct utilization consumption determination based on the validated computing resource utilization tracking data and the validated application execution tracking data.

14. The system of claim 1, where the CUE circuitry is configured to validate the computing resource utilization tracking data and the application execution tracking data by:
performing data transformations on the computing resource utilization tracking data and the application execution tracking data; and
treating outlier data, anomaly data, and missing value data in the computing resource utilization tracking data and the application execution tracking data.

15. The system of claim 1, where the computing resource utilization tracking data and the application execution tracking data originate from heterogeneous data sources.

16. A method comprising:
at network interface circuitry:
establishing a communication link to a computing resource utilization tracking data source for a set of computing resources;
at consumption unit estimation (CUE) circuitry in data communication with the network interface circuitry, the CUE circuitry executing a CUE stack:
obtaining, at an input layer of the CUE stack, computing resource utilization tracking data for a set of computing resources via the networking interface circuitry;
obtaining, at the input layer, consumption metric data;
obtaining, at the input layer, application execution tracking data for the set of computing resources via the networking interface circuitry;

obtaining, at the input layer, computing resource reservation data;
storing, at the input layer, the computing resource utilization tracking data, consumption metric data, application execution tracking data, and computing resource reservation data via a storage operation at a data-staging layer of the CUE stack;
determining, at a configuration layer of the CUE stack, a CUE interval;
determining, at the configuration layer, consumption metric modifiers for a selected identity associated with the set of computing resources;
for the CUE interval, generating, at a CUE engine layer of the CUE stack, a consumption preview by:
  advancing, according to the CUE interval, a dynamic consumption credit input/output (I/O) flow analysis; and
  based on the computing resource utilization tracking data and the application execution tracking data, executing a direct utilization consumption determination and applying the consumption metric data to the direct utilization consumption determination;
applying, at a pre-prescriptive analysis layer of the CUE stack, a filter metric by:
  determining a preservation exclusion threshold and a corrective exclusion threshold;
  accessing, via interaction with the data-staging layer, the consumption preview;
  based on the consumption preview, determining a preservable computing resource from the set of computing resources, the preservable computing resource having a preservable utilization within the preservation exclusion threshold for the CUE interval;
  based on the consumption preview, determining a correctable computing resource from the set of computing resources, the correctable computing resource having a correctable utilization outside the correction exclusion threshold for the CUE interval;
  marking the preservable computing resource for preservation in a current requisition state;
  marking the correctable computing resource for adjustment relative to the current requisition state; and
  marking the preservable computing resource and the correctable computing resource for exclusion from prescriptive utilization processing; and
initiating, at a pre-prescriptive analysis layer, the prescriptive utilization processing on the set of computing resources without computing resources marked for exclusion.

17. The method of claim 16, where executing a CUE stack further comprises generating, at a presentation layer of the CUE stack, a CUE-control interface including a CUE window configured to display at least a portion of the consumption preview.

18. The method of claim 16, where executing a CUE stack further comprises generating, at a presentation layer of the CUE stack, a CUE-control interface including a CUE interval selection control configured to accept a selection of the CUE interval from an operator.

19. The method of claim 16, where the input layer and the CUE engine layer are deployed as cloud-based execution platforms and the data-staging layer is deployed as a cloud-based database platform.

20. A product including:
machine-readable media other than a transitory signal; and
instructions stored on the machine-readable media, the instructions configured to, when executed, cause a machine to:
  at network interface circuitry:
    establish a communication link to a computing resource utilization tracking data source for a set of computing resources;
  at consumption unit estimation (CUE) circuitry in data communication with the network interface circuitry, the CUE circuitry executing a CUE stack:
    obtain, at an input layer of the CUE stack, computing resource utilization tracking data for a set of computing resources via the networking interface circuitry;
    obtain, at the input layer, consumption metric data;
    obtain, at the input layer, via the networking interface circuitry, application execution tracking data for the set of computing resources;
    obtain, at the input layer, computing resource reservation data;
    store, at the input layer, the computing resource utilization tracking data, consumption metric data, application execution tracking data, and computing resource reservation data via a storage operation at a data-staging layer of the CUE stack;
    determine, at a configuration layer of the CUE stack, a CUE interval;
    determine, at the configuration layer, consumption metric modifiers for a selected identity associated with the set of computing resources;
    for the CUE interval, generate, at a CUE engine layer of the CUE stack, a consumption preview by:
      advancing, according to the CUE interval, a dynamic consumption credit input/output (I/O) flow analysis; and
      based on the computing resource utilization tracking data and the application execution tracking data, executing a direct utilization consumption determination and applying the consumption metric data to the direct utilization consumption determination;
    apply, at a pre-prescriptive analysis layer of the CUE stack, a filter metric by:
      determining a preservation exclusion threshold and a corrective exclusion threshold;
      accessing, via interaction with the data-staging layer, the consumption preview;
      based on the consumption preview, determining a preservable computing resource from the set of computing resources, the preservable computing resource having a preservable utilization within the preservation exclusion threshold for the CUE interval;
      based on the consumption preview, determining a correctable computing resource from the set of computing resources, the correctable computing resource having a correctable utilization outside the correction exclusion threshold for the CUE interval;
      marking the preservable computing resource for preservation in a current requisition state;
      marking the correctable computing resource for adjustment relative to the current requisition state; and marking the preservable computing resource and the correctable computing resource for exclusion from prescriptive utilization processing; and initiate, at a pre-prescriptive analysis layer, the pre-scriptive utilization processing on the set of computing resources without computing resources marked for exclusion.

* * * * *